US009115295B2

(12) United States Patent
Deneuvillers et al.

(10) Patent No.: US 9,115,295 B2
(45) Date of Patent: Aug. 25, 2015

(54) VEGETABLE-BASED PRODUCTS OF THE SICCATIVE TYPE FOR RECYCLING AND REJUVENATING RECLAIMED ASPHALT PAVEMENTS IN SITU OR IN A DEDICATED PLANT

(75) Inventors: Christine Deneuvillers, Maurepas (FR); Roger Hayner, Hebron, KY (US); Jean-Paul Fort, Morristown, NJ (US)

(73) Assignee: COLAS, Boulogne-Billancourt (FR)

( * ) Notice: Subject to any disclaimer, the term of this patent is extended or adjusted under 35 U.S.C. 154(b) by 0 days.

(21) Appl. No.: 13/157,738

(22) Filed: Jun. 10, 2011

(65) Prior Publication Data

US 2012/0315088 A1    Dec. 13, 2012

(51) Int. Cl.
| | | |
|---|---|---|
| C08K 5/10 | (2006.01) | |
| C08L 95/00 | (2006.01) | |
| E01C 7/18 | (2006.01) | |
| C09D 195/00 | (2006.01) | |

(52) U.S. Cl.
CPC .............. *C09D 195/00* (2013.01); *E01C 7/187* (2013.01); *C08L 95/00* (2013.01); *C08L 95/005* (2013.01); *C08L 2555/22* (2013.01); *C08L 2555/24* (2013.01); *C08L 2555/26* (2013.01); *C08L 2555/34* (2013.01); *C08L 2555/60* (2013.01)

(58) Field of Classification Search
USPC .............................. 404/75, 79; 106/227, 229
See application file for complete search history.

(56) References Cited

U.S. PATENT DOCUMENTS

| 4,437,896 | A | * | 3/1984 | Partanen ....................... 106/223 |
|---|---|---|---|---|
| 4,453,980 | A | * | 6/1984 | Ward ............................. 264/129 |
| 4,597,799 | A | * | 7/1986 | Schilling ........................ 106/277 |
| 5,755,865 | A | * | 5/1998 | Lukens ............................ 106/279 |
| 5,895,347 | A | * | 4/1999 | Doyle .............................. 516/43 |
| 6,156,113 | A | | 12/2000 | Pasquier |
| 6,186,700 | B1 | * | 2/2001 | Omann ............................ 404/79 |
| 6,749,677 | B2 | * | 6/2004 | Freisthler ....................... 106/244 |
| 7,008,670 | B1 | * | 3/2006 | Freisthler ....................... 427/138 |
| 7,357,594 | B2 | * | 4/2008 | Takamura ........................ 404/75 |
| 7,758,686 | B2 | * | 7/2010 | Ballie et al. .................... 106/220 |
| 7,811,372 | B2 | * | 10/2010 | Nigen-Chaidron et al. .. 106/278 |
| 2004/0086335 | A1 | * | 5/2004 | Thomas et al. .................. 404/17 |
| 2009/0318602 | A1 | | 12/2009 | Deneuvillers |
| 2010/0034586 | A1 | * | 2/2010 | Bailey et al. ..................... 404/75 |
| 2011/0243661 | A1 | * | 10/2011 | Baumgardner et al. ........ 404/72 |

FOREIGN PATENT DOCUMENTS

| EP | 0 900 822 A1 | 3/1999 |
|---|---|---|
| EP | 2 135 851 A1 | 12/2009 |
| FR | 2 954 363 A1 | 6/2011 |

OTHER PUBLICATIONS

French Search Report, dated Jan. 31, 2012, from corresponding French application.

(Continued)

*Primary Examiner* — Abigail A Risic
(74) *Attorney, Agent, or Firm* — Young & Thompson

(57) ABSTRACT

A method for recycling or renovating old pavements, wherein a rejuvenating binder is used including at least one compound based on fatty substances of natural origin including hydrocarbon fatty chains, these fatty substances of natural origin having undergone at least one chemical functionalization reaction through which at least one oxygenated functional group has been introduced. The rejuvenating binders and rejuvenating binder emulsions especially suitable to the method, and asphalt mixes based on regenerated reclaimed asphalt pavement are also disclosed.

22 Claims, 3 Drawing Sheets

(56) References Cited

OTHER PUBLICATIONS

"Liant Anhydre Fluxe, Vegeflux R", Jun. 1, 2008, pp. 1-6, retrieved from the Internet: URL:http://www.colas.com/fichiers/fckeditor/file/pdf/produit/vegefluxR_1[1].pdf; Cited in French Search Report.

"Innovative Practices for Greener Roads", International Road Federation, Jan. 1, 2009, pp. 1-57, retrieved from the Internet: URL:http://www.irfnetch/files-upload/pdf-files/IRF_BP_Environment_Web.pdf; Cited in French Search Report.

Steve Phillips, "Strategic European Road Research Programme & Future Vision", Nov. 1, 2003, pp. 1-31, retrieved from the Internet: URL:http://www.e-core.org/content/workshops/nov03/phillips.pdf; Cited in French Search Report.

\* cited by examiner

Asphalt mix 1

Asphalt mix 2

Asphalt mix 3

VEGETABLE-BASED PRODUCTS OF THE SICCATIVE TYPE FOR RECYCLING AND REJUVENATING RECLAIMED ASPHALT PAVEMENTS IN SITU OR IN A DEDICATED PLANT

FIELD OF THE INVENTION

The present invention relates to a method for recycling or renovating old pavements. The present invention also relates to rejuvenating binders and rejuvenating binder emulsions especially suitable to the method of the invention. Lastly, the present invention relates to asphalt mixes based on rejuvenated reclaimed asphalt pavement.

BACKGROUND OF THE INVENTION

Traditionally, asphalt pavements are composite structures made of aggregates coated with a bituminous binder deposited onto a thickness of a few millimeters. After some time, these coatings undergo an ageing process due to the various stresses resulting from the road traffic and from the climatic conditions. This leads to a hardening of the binder, crack occurrences and/or to rutting phenomena.

A pavement treatment should therefore be foreseen to remedy such degradations. To this end, various recycling or renovating methods have been developed. The traditional recycling of pavement materials employs a wide range of adapted techniques, especially suitable to bituminous mixes. These multiple methods, which have been developed by road construction companies use specific equipments for a post-recycling in a dedicated plant or directly in situ. As regards bituminous materials, the principle upon which rehabilitation or recycling are based is directed to the regeneration of the bitumen that is present in the layer to be rejuvenated.

Indeed, the objective to aim at consists in rejuvenating the aged bitumen in the bituminous binder, the hardening of which is the consequence of the volatilization of the lightest fractions thereof. The regeneration process enables to correct the chemical constitution of the aged bitumen by means of a suitable binder so as to obtain a final binder possessing the characteristics of a traditional bitumen.

For this purpose, rejuvenating agents or binders are used since many years. The major part of the commercially available products is composed of petrochemicals based on fossil oils essentially made of naphthenic and aromatic molecules. Yet, these molecules comprise polycycloaromatic compounds (PCA) that are suspected of being carcinogenic and dangerous to the health and to the environment. Besides, some PCA-free oil molecules or vegetable-oil derived molecules like biodiesel are used sometimes. In addition, these compounds may be leached and carried along into the water tables and into the soil, thus contaminating the aquatic environment and the soils. Therefore, the use of such oils is forbidden because they are detrimental to the operator's health. In addition, they generally cannot be employed without supplying some new fresh bitumen as a supplement.

Rejuvenating binders comprising vegetable oils are also known, such as those described in the application GB 2462371. The application WO 2008/084014 also describes rejuvenating compositions comprising bitumen and palm oil.

However, rejuvenating binders based on crude oils or on vegetable oils as a drawback do give to surfaces onto which they are applied a slippery appearance because of their low reactivity.

There is therefore a need for developing new methods for recycling or for rejuvenating aged pavements by using rejuvenating binders which do not suffer from the drawbacks of the prior art.

SUMMARY OF THE INVENTION

The solution proposed in the present invention essentially uses compounds derived from renewable resources, i.e. ecologically responsible materials. This environmentally friendly solution at the same time offers higher performances as compared to the traditional products usually employed, and more particularly, to products based on aromatic molecules or other oil derivatives.

According to its most general embodiment, the present invention relates to a method for recycling or renovating old pavements, wherein a rejuvenating binder is used comprising at least one compound based on fatty substances having a natural origin comprising hydrocarbon fatty chains, wherein said fatty substances having a natural origin having undergone at least one chemical functionalization reaction having resulted in the introduction of at least one oxygenated functional group.

According to an advantageous embodiment, the rejuvenating binder is to be applied directly onto an old pavement not having undergone any step of milling or crushing. In such a case, the method of the present invention consists in rejuvenating the existing pavements in place without milling or crushing by spraying the rejuvenating binder (mode A).

According to another advantageous embodiment, the method of the present invention consists in recycling reclaimed asphalt pavements obtained through milling or crushing aged pavements, through retreating in situ or in a dedicated plant, to form wearing courses or base courses (mode B). In such a case, new mixes comprising reclaimed asphalt pavements and the rejuvenating binder are prepared.

The method of the present invention enables to:

rejuvenate the residual bitumen in reclaimed asphalt pavements, obtain an outstanding workability of the asphalt mixes during application, obtain a good cohesion of the rejuvenated mix, provide renewed flexibility and durability to older roadways at a lower cost, restore aged pavement's skid resistance, imperviousness and evenness to roadways.

The rejuvenating binder used according to the method of the present invention comprises functionalized hydrocarbon fatty substances. These compounds based on non volatile, non toxic, renewable, natural materials have a very high compatibility with the residual binder in aged pavements, with mixes and/or with reclaimed asphalt pavements. These binders give the mix its initial use properties back without releasing volatile organic compounds.

The environmentally friendly products thus play several roles in the laying down of mixes (mode B), amongst which especially the role of solvent when preparing mixes, the role of agent providing workability to the mixture and the role of reactant once laid down, so as to give the bitumen its use properties.

Moreover, these functionalized fatty substances, once deposited onto an old pavement or combined with reclaimed asphalt pavements, might react with each other or with the residual bituminous binder in the aggregate or in the old pavement. As a result, such reaction does not provide any slippery property or appearance to the surface of the pavement to be rehabilitated as opposed to the commercially available rejuvenating binders based on non functionalized, crude oils or vegetable oils. Indeed, the oils used according to the present invention have a drying potential and do react with the oxygen in the air, leading to non slippery surfaces. The oily texture does therefore change over time, leading to non slippery surfaces and therefore to surfaces that are safe to the users.

The present invention therefore relates to the use of a rejuvenating binder based on renewable raw materials, which may be deposited onto the pavements so as to soften them, to make them waterproof, give them flexibility, restore their tightness and correct the pavement's defects resulting from use and weather. The method of the present invention thus enables to extend the service life of aged pavements.

The compounds of the rejuvenating binder of the present invention enter more easily the pavement, then upon reacting with oxygen in the air, produce a new flexible regenerated pavement, with no slippery surface, which resists to ageing and to water seepage.

The method of the present invention uses a rejuvenating binder based on renewable raw materials, making it possible to produce an environmentally friendly, active product having higher rejuvenating properties than traditional products when used under similar dosage conditions.

In the first advantageous embodiment of the method of the present invention (mode A), the rejuvenating binder is used by being applied onto an old or an aged pavement. The binder enters the pavement and softens the bituminous binder and thus performs a self-repairing of the cracks. The thus treated pavement becomes flexible again and does regain protection against ageing due to climatic conditions and mechanical stresses.

Advantageously, the method in such a case has the following properties considered either alone or in combination:
the rejuvenating binder is applied at a rate ranging from 0.100 to 0.400 l/m$^2$, preferably from 0.200 to 0.350 l/m$^2$,
the rejuvenating binder is applied in an anhydrous form at a temperature ranging from 100 to 200° C.,
the rejuvenating binder is applied in the form of a rejuvenating binder emulsion.

In the second advantageous embodiment of the method of the present invention (mode B), the use of these rejuvenating binders combined with Reclaimed Asphalt Pavements (RAP) to soften and regenerate the binder, enables to better prepare the reclaimed asphalt pavements to recycling or to use them as such in the construction of new pavements. Thus, without requiring any bitumen-type, bituminous binder supply, the binder that is present within the aggregates recovers its initial performances as regards consistency, binding property and tackiness. In addition, surfaces based on such regenerated mixes look like new again, with no cracks, with no visible defects, but with good performances in terms of skid resistance and waterproofness, that is to say performances that are close to those of the initial binder used for the mix preparation.

In this embodiment, the recycling or renovation method comprises the following steps:
at least one milled or crushed part of an old pavement course, preferably of a surface course, is provided in the form of reclaimed asphalt pavements,
said reclaimed asphalt pavements are combined with the rejuvenating binder, in situ or in a dedicated plant to form an asphalt mix,
the mix is laid down to form a new pavement course, preferably a wearing course or a base course.

Advantageously, the method in this case does possess the following properties taken alone or in combination:
the reclaimed asphalt pavements are combined with the rejuvenating binder at a temperature higher than 100° C.,
the reclaimed asphalt pavements are combined with the rejuvenating binder at a temperature ranging from 20 to 100° C., preferably ranging from 45 to 65° C.,
reclaimed asphalt pavements are recycling milling products of pavement material,
reclaimed asphalt pavements comprise aggregates which largest aggregate size is 6 mm, 8 mm, 20 mm, 14 mm or 10 mm,
reclaimed asphalt pavements have a residual binder content ranging from 3.5 to 5.5.

As an alternative, the rejuvenating binder and/or the method do not comprise any asphaltene or bitumen addition. In such a case, the method does not comprise any asphaltene or bitumen addition step having a penetration index at 25° C., as measured according to standard NF EN 1426 of from 0 to 300 (1/10 mm) and a softening point ranging from 30 to 75° C., as measured according to standard NF EN 1427.

As a further alternative, the rejuvenating binder may further comprise asphaltenes. In such a case, the rejuvenating binders restore the black color on the pavement surface and repair the pavement defects while giving skid resistance and mechanical performances back to the pavement thanks to a better cohesion within the aggregates. The asphaltenes may have been either isolated from a crude oil-originating material or included within an oil-containing material such as bitumen. Indeed, the asphaltenes typically account for 5 to 30% by weight of the bitumen. In such a case, the selected bitumen may be a bitumen having a penetration index according to standard EN 1426 lower than 50 (1/10 mm), preferably the selected bitumen is a 10/30 bitumen, i.e. a hard grade bitumen. Indeed, hard grade bitumens typically have a higher asphaltene content than soft bitumens.

Advantageously (mode A or B), the rejuvenating binder comprises by weight of the rejuvenating binder total weight:
at least 50%, preferably 60% to 100%, more preferably 80 to 100% and even more preferably 85% to 100% by weight of a compound based on fatty substances of natural origin,
0 to 50%, preferably 1 to 30% and more preferably 5 to 15% by weight of a bitumen preferably selected from 10/20 grade or 20/30 grade bitumens,
0 to 10%, preferably 0 to 6% by weight of additives.

The present invention also relates to a rejuvenating binder that is especially suitable for use in the method of the present invention comprising by weight of the rejuvenating binder total weight:
at least 50%, preferably at least 60%, more preferably at least 80% and even more preferably at least 90% by weight of a compound based on fatty substances having a natural origin comprising hydrocarbon fatty chains, wherein said fatty substances having a natural origin having undergone at least one chemical functionalization reaction having resulted in the introduction of at least one oxygenated functional group,
1 to 30% and more preferably 5 to 15% by weight of a bitumen preferably selected from the 10/20 grade or 20/30 grade bitumens,
0 to 10%, preferably 0 to 6% by weight of additives preferably selected from modifying agents such as polymers, surfactants, pH modifying agents.

The rejuvenating binder comprises fatty substances of natural origin having been chemically functionalized, that is to say chemically "activated". The rejuvenating composition therefore comprises fatty substances of natural origin comprising hydrocarbon fatty chains, these fatty substances of natural origin having undergone at least one chemical functionalization reaction through which at least one oxygenated functional group has been introduced.

These fatty substances of natural origin based on animal or plant fatty substances, enable to prevent any release of volatile organic compounds (COV).

These compounds are described in the patent EP 1645 595. Preferably, the oxygenated functional group introduced upon chemical modification of the fatty substance of natural origin is selected from the following groups: carboxylic acid, carboxylic diacid, epoxide, peroxide, aldehyde, ether, ester, alcohol and ketone group, this list being non limitative. As used herein, an ether function is intended to mean an ether oxide function.

As used herein, "fatty substances of natural origin" are intended to mean fatty substances found in nature, but also their derivatives, like for example the fatty monoesters obtained by transesterification of triglyceride with monoalcohols.

The fatty substances having a natural origin to be suitably used in the present invention to undergo a chemical functionalization reaction by oxidation are selected from oils found in nature or derivatives thereof, fats found in nature or derivatives thereof, and mixtures thereof, for example animal and/or vegetable oils and fats, preferably vegetable oils and animal fats, more preferably vegetable oils.

Therefore preferably excluded from the scope of the invention are those synthetic oils and fats and fossil oils and fats, which are not renewable and which do not present any interest with a view toward sustainable development.

Vegetable oils will be preferably used, such as oils derived from sunflower, rapeseed, peanut, coconut, linseed, palm, soyabean, olive, castor, corn, pumpkin, grape seed, jojoba, sesame, walnut, hazelnut, Chinawood, tall oil, derivatives thereof, as well as their mixtures.

The fatty substances of natural origin for use in the present invention may undergo an isomerization reaction before being submitted to the chemical functionalization of the invention. As is well known, the isomerization treatment aims at increasing the number of conjugated double bonds C$=$C, which results in an increase in the drying ability and in a decrease in the initial viscosity. The conditions of such an isomerization reaction have been extensively described in the literature, for example in Baileys Industrial Oil and Fat Products, 6th Edition (2005), Fereidoon Shahidi Ed., John Wiley & Sons, Inc.

As used herein, the "chemically functionalized fatty substances of natural origin" are intended to mean fatty substances of natural origin that have been modified by introducing at least one oxygenated functional group preferably selected from carboxylic acid, carboxylic diacid, epoxide, peroxide, aldehyde, ether, ester, alcohol and ketone groups. These functional groups may react with chemical functions that are present in the hydrocarbon binder to be recycled and/or with chemical functions of other molecules in the fatty substances of natural origin. The chemical functions present in the hydrocarbon binder are for example acid or alcohol functions.

The fatty substances of natural origin which will be chemically functionalized according to the invention, and therefore activated, may thus be, without limitation, either directly the oils and fats of natural origin, or fatty acids, fatty acid esters, preferably alkyl esters, such as alkyl monoesters, fatty alcohols, fatty alcohol esters, triglycerides, fatty diacid esters, resin acid esters, resin acids, derivatives of such compounds, and mixtures of these compounds, of animal or vegetable origin.

As used herein, "fatty acids" are intended to mean saturated, mono-unsaturated or poly-unsaturated, linear or branched, cyclic or acyclic, aliphatic, mono, di- or tricarboxylic $C_4$-$C_{28}$, preferably $C_{14}$-$C_{24}$, more preferably $C_{16}$-$C_{22}$ acids.

As used herein, "fatty alcohols" are intended to mean aliphatic $C_4$-$C_{28}$, preferably $C_{14}$-$C_{24}$, more preferably $C_{16}$-$C_{22}$, saturated, mono-unsaturated or poly-unsaturated, linear or branched, cyclic or acyclic alcohols or polyols.

It is preferred to chemically functionalize fatty acids, fatty acid esters, triglycerides, fatty diacid esters, resin acids, resin acid esters, notably those fatty substances of natural origin comprising at least one fatty acid alkyl mono-ester.

The fatty substance of natural origin may be obtained from at least one triglyceride, optionally through transesterification of the latter using a $C_1$-$C_4$ alcohol, releasing fatty acid monoesters, followed with an oxidation resulting in the introduction of at least one functional group, preferably an epoxide and/or an ether group. Such transesterification aims at decreasing the viscosity of the fatty substances of natural origin.

The fatty substance having natural origin may also be obtained from at least one tall oil derivative, by oxidation resulting in the introduction of at least one functional group, preferably an epoxide and/or an ether group. The tall oil is a combination of fatty acids (oleic, linoleic, linoleic acids . . . ), of resin acids and unsaponifiable substances. As an option, the tall oil derivative may undergo an esterification using a $C_1$-$C_4$ alcohol before being or after having been submitted to the one or more oxidation reaction(s).

The fatty substances of natural origin and more particularly the hydrocarbon fatty chains of the fatty substances of natural origin for use in the present invention have C$=$C double bonds, which play a critical role in the hardening of the binder. Indeed, after spraying, the hardening of the binder is obtained by cross-linking the fatty substances in the presence of the oxygen in air.

The chemical functionalization is preferably directed to the hydrocarbon fatty chains of the fatty substances having a natural origin, especially to their C$=$C double bonds, conjugated or not. The reactants that are used for the chemical functionalization are for example molecular oxygen, hydrogen peroxide and maleic anhydride, under various temperature, pressure and reaction time conditions, optionally in the presence of catalysts. All these functionalization reactions are organic chemistry usual reactions, described for example in Baileys Industrial Oil and Fat Products, 6th Edition (2005), Fereidoon Shahidi Ed., John Wiley & Sons, Inc.

The chemical functionalizations that are conducted on the fatty substances of natural origin result typically in the introduction of many different chemical functions. They may react with the binder to be recycled and activate the hardening process for the whole hydrocarbon binder/rejuvenating composition.

The hydrocarbon fatty chains of the fatty substances having a natural origin of the invention comprise carbon-carbon double bonds, a part of which, preferably at least 5%, preferably at least 15%, more preferably at least 20% has undergone a chemical functionalization reaction having introduced an epoxide or ether group. The epoxidation reaction may be carried out by using molecular oxygen or oxygen peroxide as a reactant.

A carboxylic diacid group may be obtained, for example, by grafting a maleic anhydride molecule to a carbon-carbon double bond initially present in the fatty substance. The presence of carboxylic diacid functions on the hydrocarbon chain enables to improve the drying power of the fatty substances employed.

The hydrocarbon fatty chains of the fatty substances of natural origin of the invention comprise carbon-carbon double bonds from which at least 5%, preferably at least 15%, more preferably at least 20% has undergone a chemical functionalization reaction by grafting a maleic anhydride molecule.

The functionalization of the fatty substances of natural origin as a result causes oxygen atoms to be introduced into the molecules, which atoms may take part to the formation of oxygen bridges between the molecules and/or between the molecules and other compounds of the mixture such as bitumen.

In the case of non modified fatty substance hydrocarbon chains, these oxygen bridges are formed from the oxygen present in the air which has to be grafted onto two molecules, which makes more complicated the construction of such bridges.

Generally, the fatty substances having natural origin are fluid liquids possessing the following characteristics:

a kinematic viscosity at 40° C. ranging from 4 to 20 mm$^2$/s, preferably from 7 to 11 mm$^2$/s an acid number according to standard NF T 60-204 higher than 5, more preferably higher than 10 mg KOH/g, an iodine number according to standard ISO 3961 higher than 60 g I$_{2/100}$ g, a saponification number according to standard ISO 3657 ranging from 150 to 250 mg KOH/g, a peroxide number according to standard NF T 60-220 lower than 10, more preferably lower than 5 meq O2/kg, a water content according to standard NF T 60-113 lower than 0.5%, a relative density at 25° C. according to standard ISO 3838 ranging from 0.88 to 0.98, a Cleveland flash point according to standard EN ISO 2592 higher than 140° C., preferably higher than 160° C.

The fatty substance having natural origin is preferably a vegetable oil, a derivative thereof such as its fatty acid fraction, a combination of fatty acids, a transesterification product or an alkyd resin derivative of the oil.

The compound based on fatty substances of natural origin is preferably selected from the esterified and expoxidized tall oil derivatives and the monounsaturated and polyunsaturated fatty acid esters comprising linear hydrocarbon fatty chains of from 8 to 20, preferably of from 16 to 20 carbon atoms such as rapeseed oxidized fatty acid esters. These fatty substances are marketed under the trade name VEGEFLUX®.

The rejuvenating binder may be used in an anhydrous form, that is to say without water addition. The rejuvenating binder may also be used in the form of a rejuvenating binder emulsion. In such a case, such rejuvenating binder emulsion may be obtained by preparing a traditional emulsion (oil in water) or conversely (water in oil), where the lipophilic phase is made of the functionalized compound based on fatty substances of natural origin or its combination with the asphaltenes and other additives.

Preferably, the rejuvenating binder emulsion comprises in kg/t of the emulsion:

500 to 900 kg/t, preferably 650 to 850 kg/t of rejuvenating binder, and water to 100% for preparing one ton of emulsion.

Additives are preferably selected from modifying agents such as polymers, surfactants, pH modifying agents, adhesion dopes. Polymers may be selected from SBS, SB, SBR, natural latex, EVA, etc. Adhesion dopes may be selected from alkyl-polyamines such as alkyl amido-polyamines or alkyl imidazo-polyamines. Hydrochloric acid may be used as a pH modifying agent.

Additives may be added directly to the rejuvenating binder or, for the mode B, upon combining the various components of the mix. When the additives are added to the mixes, they are preferably selected from paraffins, polyethylene waxes, polyethylene granules, EVA or other thermoplastic or thermosetting polymers. Their role consists in providing special mechanical performances. The additives are present in amounts ranging from 0.05 to 30% of the mix weight, preferably from 0.2 to 3%.

The present invention also relates to an asphalt mix for road pavements comprising aggregates, a hydrocarbon binder and optionally additives characterized in that it comprises by weight of the asphalt mix total weight:

at least 80% by weight, preferably at least 95% by weight, and more preferably at least 99% by weight of reclaimed asphalt pavements, 0.1 to 2% by weight, preferably 0.1 to 1.5% by weight and more preferably 0.2 to 1% by weight of a rejuvenating binder such as defined hereabove, 0 to 30% by weight, preferably 0.05 to 15% by weight and more preferably 0.2 to 3% by weight of additives.

An asphalt or bituminous mix is a mixture of at least one aggregate and at least one hydrocarbon binder (essentially bitumen). During the pavement deconstruction operations, the older mixes are recovered to be reused. These so called old or aged mixes, once recrushed or milled are called reclaimed asphalt pavements. As used herein, reclaimed asphalt pavements are intended to mean mixes resulting from the milling of the asphalt layer, from the crushing of plates removed from asphalt pavements, of pieces of asphalt plates, of asphalt wastes or asphalt excess production (definition according to standard NF EN 13108-8). Reclaimed asphalt pavements are composed of aggregates accounting for more than 90% by weight of the sum of aggregate and bitumen or hydrocarbon binder.

Aggregate of reclaimed asphalt pavements typically have a particle size within the range 0/D$_{max}$, D$_{max}$ being the maximal diameter of the aggregates such as defined according to standard NF EN 13043 18-540 and typically of from 0 to 31.5 mm. Aggregates will be preferably used within the ranges 0/20, 0/14 and 0/10. Reclaimed asphalt pavements diameter is preferably lower than 40 mm.

The mix obtained according to the method implementing mode B may be prepared according to a hot or a cold mix process. The difference between both methods essentially relies on the aggregate temperature.

In the so called "hot process", reclaimed asphalt pavements and optionally the rejuvenating binder, preferably in an anhydrous form, are heated to temperatures higher than 100° C. so as to enable a good mixing of the aggregates with the rejuvenating binder. The thus formed mix is then hot-applied (typically at a temperature higher than 150° C.) onto the pavement, then also hot-compacted.

In the so called "cold processes", the aggregates are not dried, and are mixed as such, that is to say with their natural moisture and at ambient temperature, the rejuvenating binder being preferably brought to an emulsion at a temperature close to the ambient temperature. The emulsion is sometimes slightly warmed up to temperatures of about 50° C.

The mixes prepared may be stored, be used as they are or be heated to temperatures of from about 30 to 150° C., preferably of from 45 to 150° C. In one embodiment of the method of the invention implementing mode B, the mix is prepared and/or stored and/or laid down at a temperature higher than 100° C.

The lead time for mixes once they have been warmed up is of the same order as that of hot-applied mixes. They are applied with the same application equipments.

The method implementing mode B may further have the following properties taken alone or in combination:

the method does not comprise any additional step for supplying aggregates other than those coming from the reclaimed asphalt pavements, that is to say the mixes resulting from the process are essentially composed of reclaimed asphalt pavements, the mix is prepared and laid down at a temperature ranging from 50 to 200° C., the mix is prepared at a temperature ranging from 50 to 100° C., the mix is prepared at a temperature ranging from more than 100° C. to 200° C., the mix comprises at least 80% by weight, preferably at least 95% by weight, and more preferably at least 99% by weight of reclaimed asphalt pavements, the aggregates comprise at least 80% by weight, preferably at least 95% by weight, and more preferably at least 99% by weight of aggregates resulting from reclaimed asphalt pavements relative to the aggregate total weight in the mix, the method further comprises:
one or more additional steps for heating the reclaimed asphalt pavements to obtain a temperature in the mix of from 50 to 100° C., preferably from 60 to 90° C. and more preferably from 70 to 85° C., and/or
a step for storing said mix before the laying step, and/or
a step for compacting the mix once laid down.

Preferably, reclaimed asphalt pavements are milling products resulting from the recycling of pavement material wherein the aggregate largest size is 20 mm and the asphalt pieces highest size is 40 mm.

The mix may be prepared, then hauled to the worksite, to be laid down there. The mix is generally laid down during a spreading step wherein said mix is spread onto a receiving surface such as a pavement. The spreading may be performed by using a paver. This spreading step is followed with a compacting step. The compaction may be performed by using mixed compactors or vibrating rollers (or even double rollers). In some cases, the use of wheeled compactors may be envisaged. The mix may therefore be heated prior to being spread, that is to say before or after its transport to the worksite, if needed, whether there is a storage phase or not.

The hydrocarbon binders for making the reclaimed asphalt pavements may be natural or synthetic. The binder is typically a hydrocarbon binder selected from road asphalts, pure bitumens, bitumens that have been modified by polymers and all combinations of these bitumens. Also included as bitumens or hydrocarbon binders in the context of the present invention are the binders of vegetable origin such as Végécol®, marketed by the Colas company and described in the French patent application FR 2 853 647, the oil-containing synthetic binders such as the binder range Bituclair® marketed by the Colas company.

Bitumens that have been modified by polymers are such as defined according to standard NF EN 125291 and to the user guide entitled "Guide Technique: emploi des liants modifiés, des bitumes spéciaux et des bitumes avec additifs en techniques routières" published by the Laboratoire Central des Ponts and Chaussées LCPC ISSN 1151-1516 ISBN 2-7208-7140-4). To be mentioned as polymers for use to modify bitumens are styrene-butadiene copolymers, styrene-isoprene copolymers, ethylene-vinylacetate (EVA) copolymers, terpolymers, such as for example the compound of an ethylene chain with butyl and glycidyl acrylate and methyl acrylate functional moieties providing a good stability to the bitumen/polymer mixture, where the elastomers and plastomers enable to significantly improve the cracking and rutting resistance.

Advantageously, the binder average content in the reclaimed asphalt pavements, as measured according to standard EN 12697-1, is higher than or equal to 3.5% by weight, preferably, higher than or equal to 4.8% by weight, and more preferably higher than or equal to 5% by weight, relative to the weight of aggregate derived from the reclaimed asphalt pavements.

The binder average content in the reclaimed asphalt pavements as measured according to standard EN 12697-1 may also range from 4 to 10%, preferably from 4.5 to 6.5% by weight of the weight of aggregates derived from the reclaimed asphalt pavements.

DETAILED DESCRIPTION OF THE INVENTION

The present invention will be illustrated by the following examples. Unless otherwise specified, the percentages used in the examples are expressed by weight.

EXAMPLES

I. Examples of Rejuvenating Binder Emulsions that May be Used in the Methods of the Invention

| Rejuvenating binder | Amount of végéflux ® | Bitumen esso 20/30 PJ | Surfactants | | Other additives | |
|---|---|---|---|---|---|---|
| | | | Nature | amount | Nature | amounts |
| LR1 | 720 kg/t | 80 kg/t | AFM: neutral surfactant | 5 kg/t | — | — |
| LR2 | 720 kg/t | 80 kg/t | TNB: polyimidazoline | 2 kg/t | HCl | 1.2 kg/t |
| LR3 | 720 kg/t | 80 kg/t | APG: alkyl polyglucoside | 5 kg/t | — | — |
| LR4 | 720 kg/t | 80 kg/t | MD: polyimidazoline | 4 kg/t | HCl | 8.7 kg/t |
| LR1bis | 700 kg/t | — | AFM: neutral surfactant | 5 kg/t | — | — |
| LR2bis | 700 kg/t | — | TNB: polyimidazoline | 2 kg/t | HCl | 1.2 kg/t |

Emulsions comprise water in a sufficient amount to obtain 1 ton emulsion.

| Name: | | 1 | 2 | 3 | 4 | 1bis | 2bis |
|---|---|---|---|---|---|---|---|
| Rejuvenating binder concentration in the emulsion | % | 80 | 80 | 80 | 80 | 70 | 70 |
| BINDER | Kg/t | 800 | 800 | 800 | 800 | 700 | 700 |
| Végéflux ® | % | 90 | 90 | 90 | 90 | 100 | 100 |
| Bitumen 10/20 Esso | % | 10 | 10 | 10 | 10 | 0 | 0 |
| WATER PHASE | Kg/t | 200 | 200 | 200 | 200 | 300 | 200 |
| Glucopon 650 EC | Kg/t | — | — | 5 | — | — | — |
| amine-containing surfactant TNB* (75% plant materials) | Kg/t | — | 2 | — | — | — | 2 |
| MD | Kg/t | — | — | — | 10 | — | — |
| Hydrochloric acid 32% | Kg/t | — | 1.2 | — | 8 | — | 1.2 |
| AFM | Kg/t | 5 | — | — | — | 5 | — |
| Laser particle size analysis MOPCST EM-005 | μm | 8.2 | 3.8 | 4.6 | 22. | — | — |
| Median diameter | μm | 0.5 | 0.2 | 0.3 | 1 | — | — |
| Standard deviation (log 10) | | 9 | 2 | 7 | 0.64 | — | — |
| PH water phase NF EN 12850 (02) | | — | — | — | — | 7.11 | 2.48 |
| PH Emulsion NF EN 12850 (02) | | 2.4 | 2.6 | 4.14 | 4.26 | 2.5 | 2.5 |
| IREC - manual - Sikaisol - NF EN 13075-1 (02) | | | | | | | |
| Class (EN13808): class 3 | g | 58 | 55 | 53 | 59 | 69 | 62 |
| Pseudo viscosity STV EN 12846 (02) | | | | | | | |
| (class EN 13808) | s | 28 | 71 | 28 | 67 | — | — |
| Temperature | °C. | 40 | 40 | 40 | 40 | — | — |
| Orifice | mm | 2 | 2 | 2 | 2 | — | — |

II. Method Implementing Mode A a. Starting Materials

| Rejuvenating binder | RH 2008-01 | RH2008-2 |
|---|---|---|
| Végéflux ® | 100% | 70% |
| Asphaltene mixture | — | 30% |

% by weight of the rejuvenating binder total weight b. Method of Application

Figure 1:
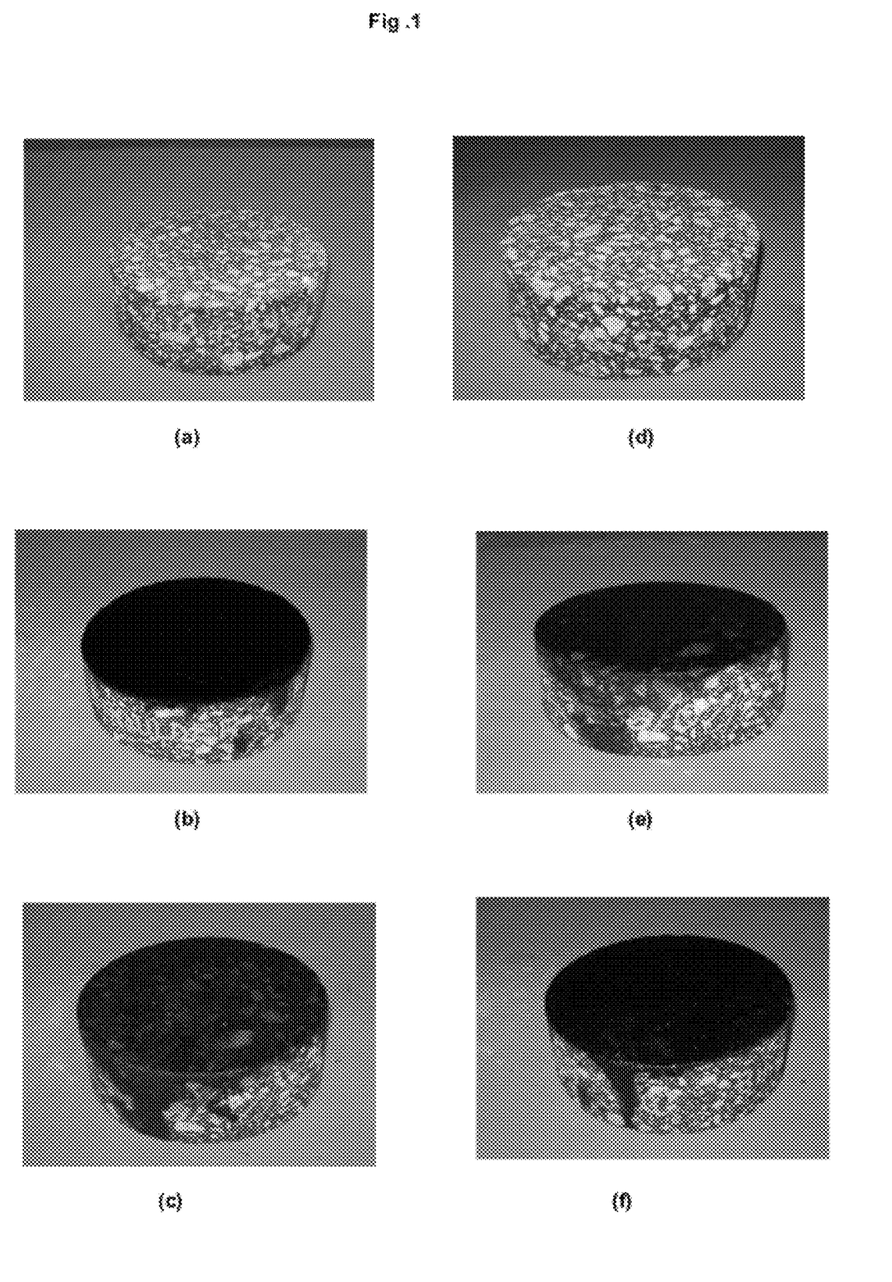
FIG. 1 shows photographs of core slices before treatment (photographs a and d), 1 hr after treatment by rejuvenating binder RH 2008-01 and RH2008-2 (respectively photographs b and e) and after one week of treatment by rejuvenating binder RH 2008-01 and RH2008-2 (respectively photographs c and f)

| Properties | Control | | RH 2008-01 | | RH2008-2 | |
|---|---|---|---|---|---|---|
| I. Uniform application over the surface of extracted cores at rate 0.283 l/m². | | | | | | |
| Rejuvenating binder application | — | | 0.283 l/m² | | 0.283 l/m² | |
| Grams applied (g) | 0 | 0 | 4.7 | 4.7 | 4.8 | 4.8 |
| II. Evaluation of the pavement softening after treatment | | | | | | |
| A. Penetration (D 5602 modified at 25° C.) | | | | | | |
| Before treatment | 0.013 | 0.017 | 0.011 | 0.015 | 0.022 | 0.019 |
| 1 hr after treatment | 0.013 | 0.017 | 0.017 | 0.016 | 0.014 | 0.017 |
| After one week conditioned | 0.012 | 0.014 | 0.015 | 0.014 | 0.018 | 0.017 |
| B. Photographs (FIG. 1) | | | | | | |
| Before treatment | | | a | | d | |
| 1 hr after treatment | | | b | | e | |
| After one week conditioned | | | c | | f | |
| III. Top layer (thickness 6.4 mm): Property of the extracted and recovered binder | | | | | | |
| A. Weight and measures (D 3509) | | | | | | |
| Weight | 257.0 | 236.4 | 283.7 | 275.2 | 223.7 | 274.5 |
| thickness | 0.252 | 0.238 | 0.272 | 0.267 | 0.239 | 0.265 |
| B. Extraction with toluene (D 2172) | | | | | | |
| Binder extract weight (g) | 13.3 | 13.2 | 16.0 | 15.9 | 12.7 | 16.0 |
| Aggregate weight after extraction | 244.2 | 224.3 | 268.7 | 259.8 | 223.7 | 274.2 |
| % binder | 5.2 | 5.2 | 5.6 | 5.8 | 5.7 | 5.8 |

| Properties | | Control | RH 2008-01 | RH2008-2 |
|---|---|---|---|---|
| IV. Tests conducted on the binder recovered from 2 core slices in the top layer | | | | |
| DSR (1 rad/s), | 58° C. | 3.092/53.1 | 0.206/68.5 | 0.141/76.6 |
| G*, kPa/δ, ° | 60° C. | 2.604/53.1 | 0.168/70.3 | 0.113/78.2 |
| (AASHTO T 315) | 64° C. | 1.836/53.5 | 0.110/74.2 | 0.073/73.0 |
| Dynamic viscosity (AV), P | | 26 040 | 1 675 | 1 129 |
| V. Second top layer (thickness 6.4 mm): Property of the extracted and recovered binder A. Weight and measures (D 3509) | | | | |

| | | | | | | |
|---|---|---|---|---|---|---|
| Weight | 227.9 | 262.5 | 270.7 | 265.6 | 282.7 | 257 |
| Thickness | 0.219 | 0.251 | 0.257 | 0.254 | 0.275 | 0.248 |
| B. Extraction with toluene (D 2172) | | | | | | |
| Binder extract weight (g) | 12.3 | 14.5 | 14.8 | 15.1 | 15.9 | 14.0 |
| Aggregate weight after extraction | 215.6 | 248.3 | 255.9 | 250.5 | 266.8 | 243 |
| % binder | 5.4 | 5.5 | 5.5 | 5.7 | 5.6 | 5.4 |
| VI. Tests conducted on the binder recovered from 2 core slices in the second layer | | | | | | |

| Properties | | Control | RH 2008-01 | RH 2008-2 |
|---|---|---|---|---|
| DSR (1 rad/s), | 58° C. | 4.11/52.7 | 2.705/52.3 | 2.633/54.4 |
| G*, kPa/δ, ° | 60° C. | 3.406/52.6 | 2.304/52.2 | 2.251/54.5 |
| (AASHTO T 315) | 64° C. | 2.367/52.7 | 1.643/52.7 | 1.580/55.3 |
| Dynamic viscosity (AV), P | | 34 060 | 23 40 | 22 560 |

Both tested rejuvenating binders applied at a rate of 0.283 l/m$^2$ enabled to recover a viscosity level higher than the at least 20% required:

higher than 90% for the binder in the top layer with a thickness of 6.4 mm ("top ¼" layer"), higher than 30% for the binder in the layer located under the top layer which thickness is also 6.4 mm ("second ¼" layer").

| | | | viscosity % reduction top layer with a thickness of 6.4 mm | | viscosity % reduction Second layer with a thickness of 6.4 mm | |
|---|---|---|---|---|---|---|
| Properties | | Control | RH 2008-01 | RH 2008-02 | RH 2008-01 | RH 2008-02 |
| DSR (1 rad/s), | 58° C. | 3.092/53.1 | 93.3 | 95.4 | 34.1 | 34.8 |
| G*, kPa/δ, ° | 60° C. | 2.604/53.1 | 93.5 | 95.7 | 32.6 | 33.8 |
| (AASHTO T 315) | 64° C. | 1.836/53.5 | 94 | 96 | 30.6 | 33.2 |
| Dynamic viscosity P | 60° C. | 26 040 | 93.6 | 95.7 | 32.4 | 33.8 |

This assay enables to evaluate the change in the rheological properties and especially the complex module reduction. Once the G*curves=f(temperature) have been plotted, values are read at 4 different temperatures, for each sample.

Spraying rejuvenating binders does not modify the pavement hardness such as measured according to standard ASTM D 5602 modified for pavements. No surface softening could be observed.

The results obtained demonstrate that both rejuvenating binders do penetrate under the 6.4 mm-thick top layer and the 6.4 mm-thick second layer.

The binder recovery standard methods show that the high melting point components of the rejuvenating binders do not easily evaporate.

III. Method Implementing Mode B a. Starting Materials
Reclaimed Asphalt Pavements

| Milling products | A | B | C |
|---|---|---|---|
| milling product particle size | 0/20 | 0/10 | 0/10 |
| bitumen content | 3.8% | 5.2%. | 4.8% |
| water percentage | 3.4% | 3%** | 4.5% |

*by weight of the aggregate total weight
**2% aggregate + 1% addition

| Sieve (mm) | 20 | 14 | 12.5 | 10 | 8 | 6.3 | 4 | 2 | 1 | 0.50 | 0.063 |
|---|---|---|---|---|---|---|---|---|---|---|---|
| Milling product A % passing fraction before stripping | 99 | 83 | — | 51 | — | 23 | 13 | 6 | 2 | 0.7 | 0.1 |
| Milling product A % passing fraction after stripping | 100 | 94 | — | 77 | — | 51 | 39 | 29 | 22 | 18 | 8.5 |
| Milling product B % passing fraction after stripping | 100 | 100 | 100 | 98 | 84 | 69 | 52 | 38 | 28 | 21 | 8.5 |

| Sieve (mm) | 20 | 14 | 12.5 | 10 | 8 | 6.3 | 4 | 2 | 1 | 0.50 | 0.063 |
|---|---|---|---|---|---|---|---|---|---|---|---|
| Milling product C % passing fraction after stripping | 100 | 98 | 95 | 87 | 76 | 64 | 52 | 41 | 29 | 22 | 10.6 |

Stripping consists in removing the binder and in recovering the aggregates derived from reclaimed asphalt pavements.

Rejuvenating Binder

Rejuvenating binder comprising 100% by weight of Végéflux® possessing the following characteristics:
  Water content NF T 60-113%<0.5,
  Relative density at 25° C. ISO 3838/0.88 to 0.98,
  Viscosity at 40° C. mm²/s 7 to 11,
  Cleveland flash point EN ISO 2592>160° C.

b. Mix Formulation

The tested mixes are obtained by combining therewith the rejuvenating binder at various concentration levels.

| Formula | Control A | Control B | Control C | Mix 1 | Mix 2 | Mix 3 | Mix 4 | Mix 5 |
|---|---|---|---|---|---|---|---|---|
| Milling product | A: 100% | B: 100% | B: 100% | A: 99.5% | A: 99.3% | A: 99.0% | B: 99.5% | C: 99.75% |
| Végéflux ® | 0% | 0% | 0% | 0.5% | 0.7% | 1.0% | 0.5% | 0.25% | c. Properties

Figure 2:
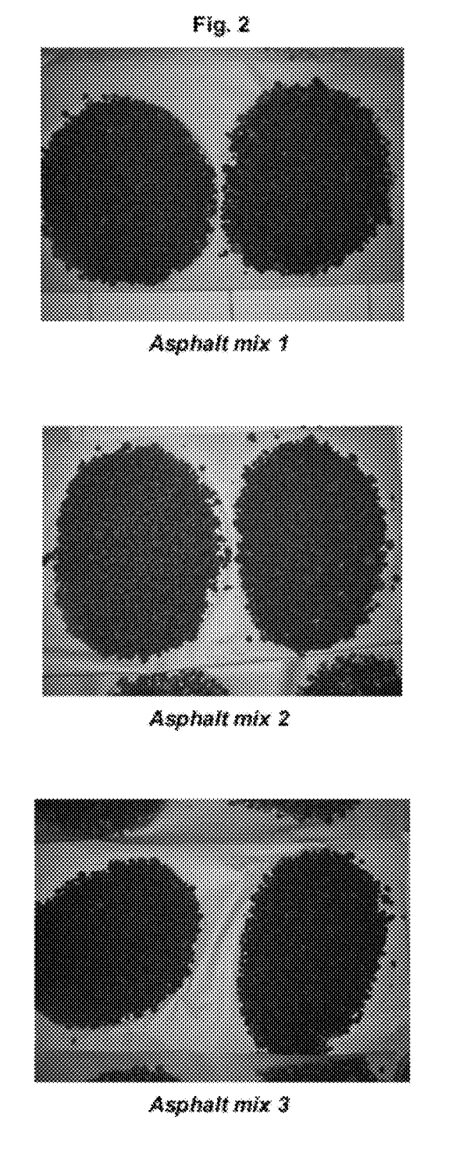
FIG. 2 shows for the three mixes 1 to 3 of the present invention the mixing quality at 20 and 60° C. (20° C. on left and 60° C. on right for each picture)

Mixing Quality:

FIG. 2 illustrates for the three mixes 1 to 3 of the present invention the mixing quality at 20 and 60° C. (20° C. on left and 60° C. on right for each picture). The mixing is carried out by combining the rejuvenating binder with milling products at the stated temperature.

| Formula | Mix 1 | Mix 2 | Mix 3 |
|---|---|---|---|
| Mixing quality at 20° C. | Good | Better than for E1 | very good |
| Mixing quality at 60° C. | slight stripping | slight stripping | no stripping |
| Workability after 4 hours | Workability | good | excellent |

Evaluation of the Water Resistance According to Duriez Test:

In this assay, Duriez expanded specimens are made at 20° C., then warmed-up and optionally remalaxed for 30 seconds at 60° C. or at 80° C. The molding conditions are those described in Standard NF P 98-251-4, mode 1 or 2, under a compacting load of 40 KN or 60 KN to increase the assay's discriminating character. The storage conditions are 14 days at 18° C. and 50% humidity for the air compression test and 7 days at 18° C. and 50% humidity and 7 days in water at 18° C. for the water compression test. The after-immersion resistance to dry strength ratio gives the water resistance of the mixture.

Gyratory Shear Press (PCG) Assay:

This assay aims at evaluating the compacting behavior of the asphalt mixes. This assay is defined in Standard NF EN 12697-31. It consists in measuring the specimen height to deduce therefrom the evolution of the void content V as a function of the gyration number. The assays are performed on 160 mm molds, with a 0.6 MPa vertical load and a speed of 6 rotations per minute as for cold mixes.

Rutting Assay According to Standard NF EN 12697-22:

The aim of this assay consists in characterizing the rutting resistance of asphalt mixes under conditions that may be compared to the stresses prevailing on roads. In this assay, the rut depth evolution is measured as a function of the number of cycles. The rutting assays are performed on 5 or 10 cm-thick mix plates, conditioned for 14 or 15 days at 35° C.

| Formulation Number | Control A | | | Mix 1 | | | Mix 2 | |
|---|---|---|---|---|---|---|---|---|
| Temperature (° C.) | 20 | 60 | 80 | 20 | 60 | 80 | 20 | 80 |
| Duriez (mode 2, 40 KN) | | | | | | | | |
| % geometric voids | 27.3 | 23.7 | 22.3 | 23.5 | 18.6 | 20 | 21.0 | 20.9 |
| % hydrostatic voids | / | 18.7 | 17.3 | 18.1 | 15.0 | 15.3 | 15.8 | 16.1 |
| R air strength (MPa) | 2.1 | 3.6 | 5.0 | 0.9 | 1.0 | 0.7 | 1.6 | 1.3 |
| r strength after immersion (MPa) | 0.8 | 1.2 | 2.0 | 0.3 | 0.4 | 0.3 | 0.6 | 0.4 |
| r/R | 0.36 | 0.33 | 0.40 | 0.37 | 0.42 | 0.36 | 0.37 | 0.34 |
| PCG | | | | | | | | |
| 100 Gyrations | 30.0 | 22.0 | — | 20.8 | 16.4 | — | — | — |
| 200 Gyrations | 28.5 | 21.5 | — | 19.7 | 15.5 | — | — | — |
| Slope | 2.85 | 1.13 | — | 2.02 | 2.17 | — | — | — |
| Rutting at 60° C. | | | | | | | | |
| % voids | >30 | 26.4 | — | 25 | 16.9 | — | — | — |
| % Ruts at 10000 Cycles | 15.9 | 2.9 | — | — | 5.5 | 5.0 | — | — |

The PCG assay demonstrates a satisfactory workability and a compliant rutting resistance.

| Formulation Number | Control B | | Mix 4 | | Control C | | Mix 5 | | |
|---|---|---|---|---|---|---|---|---|---|
| Temperature (° C.) | 60° C. | 80° C. | 60° C. | 80° C. | 60° C. | 80° C. | 20° C. | 60° C. | 80° C. |
| Duriez (mode 1, 60 KN) | | | | | | | | | |
| % geometric voids | 8.5 | 8.6 | 7.2 | 7.3 | 4.8 | 4.3 | 9.0 | 3.2 | 3.1 |
| % hydrostatic voids | 6.7 | 6.5 | 5.8 | 5.7 | 5.1 | 3.5 | 8.3 | 3.6 | 3.0 |
| $C_D$ (MPa) | 13.7 | 15.2 | 4.4 | 5.1 | 18.3 | 19.1 | 10.7 | 11.1 | 10.6 |
| $C_W$ (MPa) | 8.2 | 8.6 | 2.9 | 3.2 | 12.1 | 13.7 | 5.7 | 7.9 | 7.9 |
| $C_W/C_D$ | 60 | 57 | 65 | 64 | 66 | 72 | 53 | 71 | 75 |
| PCG | | | | | | | | | |
| 40 Gyrations | — | — | — | — | 14.2 | 12.1 | — | 10.0 | 9.9 |
| 60 Gyrations | 15.2 | 11.2 | 7.7 | 7.3 | — | — | — | — | — |
| 200 Gyrations | 14.3 | 10.4 | 6.0 | 6.1 | 12.6 | 9.8 | — | 7.4 | 6.9 |
| Slope | 1.23 | 1.91 | 2.59 | 2.37 | 1.79 | 2.24 | — | 1.78 | 2.41 |
| Rutting at 60° C. | | | | | | | | | |
| Plate thickness | 10 | 10 | 10 | 10 | 5 | 5 | — | 5 | 5 |
| % voids | 15.4 | 10.7 | 6.9 | 4.8 | 17.2% | 15.9% | — | 13% | 13.2% |
| % Ruts at 300 Cycles | — | — | 19.0 | 19.3 | — | — | — | — | — |
| % Ruts at 30000 Cycles | 4.0 | 2.4 | — | — | 4.1 | 3.5 | — | 3.4 | 5.1 |

Figure 3:
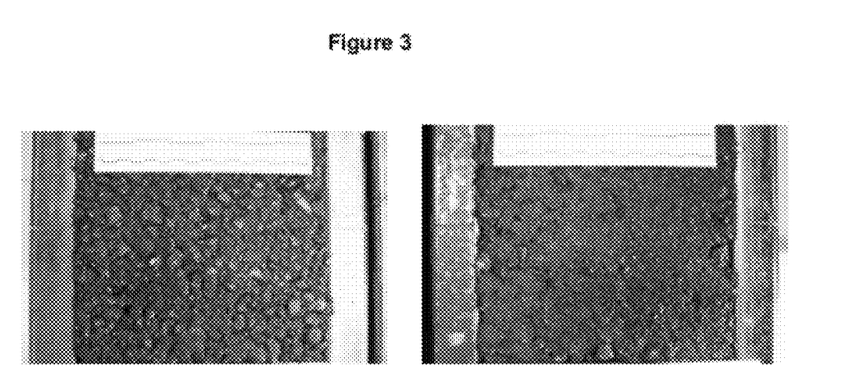
FIG. 3 shows the control mix B illustrated on the left picture and the mix 4 of the invention illustrated on the right picture obtained at 80° C.

As regards mix 4, the high fluxing power of the rejuvenating binder based on Végéflux® and the binder high content in the reclaimed asphalt pavements enable to reduce the amount of Végéflux to 0.5%. FIG. 3 compares the control mix B illustrated on the left picture and the mix 4 illustrated on the right picture obtained at 80° C. A marked improvement can be noticed in the visual appearance of the mix after addition of 0.5% of rejuvenating binder. Mix 4 is particularly suitable to low traffic volume flexible pavements.

As regards mix 5, two maturing protocols were studied:

14 days at 18° C. and 50% humidity for the air compression test and 7 days at 18° C. and 50% humidity plus 7 days in water at 18° C. for the water compression test, 7 days at 35° C. plus 7 days at 18° C. and 50% humidity for the air compression test and 7 days at 35° C. plus 7 days in water at 18° C. for the water compression test.

The mixes were prepared at 20° C., warmed-up and remalaxed for 30 s at 60° C. or 80° C. The visual appearance of all tested products was satisfactory (good mixing quality)

| Formulation Number | | Control C | | Mix 5 | | |
|---|---|---|---|---|---|---|
| DURIEZ Series | | A | B | H | E | F |
| Temperature (° C.) | | 60 | 80 | 20 | 60 | 80 |
| Maturing 7 days 18° C. | % geometric voids | 4.8 | 4.3 | 9.0 | 3.2 | 3.1 |
| | % hydrostatic voids | 5.1 | 3.5 | 8.3 | 3.6 | 3.0 |
| | R (MPa) | 18.3 | 19.1 | 10.7 | 11.1 | 10.6 |
| | r (MPa) | 12.1 | 13.7 | 5.7 | 7.9 | 7.9 |
| | r/R (%) | 66 | 72 | 53 | 71 | 75 |
| Maturing 7 days 35° C. | % geometric voids | 4.8 | 4.3 | 9.0 | 3.2 | 3.1 |
| | % hydrostatic voids | 5.1 | 3.5 | 8.3 | 3.6 | 3.0 |
| | R (MPa) | 19.4 | 19.9 | 12.8 | 12.4 | 11.7 |
| | r (MPa) | 14.3 | 15.8 | 7.1 | 9.1 | 8.9 |
| | r/R (%) | 74 | 80 | 55 | 74 | 76 |

A maturing for 7 days at 35° C. instead of 7 days at 18° C. improved the mechanical performances and the water strength for all products. For the Formula 100% reclaimed asphalt pavements, these results confirm the benefit resulting from the warming up to 80° C. of the product, to improve the workability and the performances thereof. Performances close to those of a 35/50 mix are obtained.

Rutting assays for mix 5 were performed on 5 cm-thick plates to control the product conformity to the preamble of Standard NF EN 13108-1 with BBMC class 2, i.e. less than 15% at 10000 cycles. These assays confirm the good behavior of the mix towards rutting.

The invention claimed is:

1. A method for recycling or renovating old pavements, comprising the step of:
   recycling reclaimed asphalt pavements obtained through milling or crushing said reclaimed asphalt pavements with a rejuvenating binder so as to form a new pavement course,
   wherein the rejuvenating binder comprises by weight of the rejuvenating binder total weight: 85% to 100% by weight of at least one compound based on fatty substances of a natural origin and comprising hydrocarbon fatty chains, 5% to 15% by weight of bitumen, and 0% to 10% by weight of additives,
   wherein said at least one compound is an esterified and epoxidized tall oil derivative comprising linear hydrocarbon fatty chains of from 8 to 20 carbons, and
   wherein the rejuvenating binder is used in an anhydrous form or in a form of a rejuvenating binder emulsion.

2. The recycling or renovating method according to claim 1, wherein the rejuvenating binder emulsion comprises in kg/t of the emulsion:
   500 to 900 kg/t of rejuvenating binder, and
   water to 100% for preparing one ton of emulsion.

3. The recycling or renovating method according to claim 1, wherein the recycling reclaimed asphalt pavements obtained through milling or crushing said reclaimed asphalt pavements with said rejuvenating binder so as to form a new pavement course comprises the following steps:
   at least one milled or crushed part of an old pavement course is provided in the form of reclaimed asphalt pavements,
   said reclaimed asphalt pavements are combined with the rejuvenating binder, in situ or in a dedicated plant to form an asphalt mix, and
   the mix is laid down to form a new pavement course.

4. The recycling or renovating method according to claim 3, wherein the reclaimed asphalt pavements are combined with the rejuvenating binder at a temperature higher than 100° C.

5. The recycling or renovating method according to claim 3, wherein the reclaimed asphalt pavements are combined with the rejuvenating binder at a temperature ranging from 20 to 100° C.

6. The recycling or renovating method according to claim 3, wherein the reclaimed asphalt pavements are recycling milling products of pavement material.

7. The recycling or renovating method according to claim 1, wherein the bitumen is selected from 10/20 grade or 20/30 grade bitumens.

8. The recycling or renovating method according to claim 1, wherein said esterified and epoxidized tall oil derivative comprising linear hydrocarbon fatty chains of from 8 to 20 carbons is prepared by subjecting a tall oil derivative to an isomerization reaction before oxidation, so as to increase the number of conjugated double bonds C=C in said esterified and epoxidized tall oil derivative.

9. The recycling or renovating method according to claim 1, wherein the hydrocarbon fatty acid chains of said fatty substances of a natural origin comprise carbon-carbon double bonds, of which at least 5% have an epoxide group.

10. The recycling or renovating method according to claim 1, wherein the hydrocarbon fatty chains of the fatty substances of a natural origin comprise carbon-carbon double bonds, of which at least 15% have an epoxide group.

11. The recycling or renovating method according to claim 1, wherein the hydrocarbon fatty chains of the fatty substances of a natural origin comprise carbon-carbon double bonds, of which at least 20% have an epoxide group.

12. The recycling or renovating method according to claim 1, wherein the hydrocarbon fatty chains of the fatty substances of a natural origin comprise carbon-carbon double bonds of which least 5% have undergone a chemical functionalization reaction by grafting a maleic anhydride molecule.

13. The recycling or renovating method according to claim 1, wherein the hydrocarbon fatty chains of the fatty substances having a natural origin comprise carbon-carbon double bonds of which at least 15% has undergone a chemical functionalization reaction by grafting a maleic anhydride molecule.

14. The recycling or renovating method according to claim 1, wherein the hydrocarbon fatty chains of the fatty substances having a natural origin comprise carbon-carbon double bonds of which at least 20% has undergone a chemical functionalization reaction by grafting a maleic anhydride molecule.

15. An asphalt mix for road pavements comprising:
aggregates;
a hydrocarbon binder, comprising by weight of the asphalt mix total weight:
at least 99% by weight of reclaimed asphalt pavements, 0.2 to 1% by weight of a rejuvenating binder comprising by weight of the rejuvenating binder total weight: 85% to 100% by weight of at least one compound based on fatty substances of natural origin, 5% to 15% by weight of bitumen, and 0% to 10% by weight of additives, said at least one compound is an esterified and epoxidized tall oil derivative comprising linear hydrocarbon fatty chains of from 8 to 20 carbons; and additives.

16. The asphalt mix for road pavements according to claim 15, wherein the aggregates are composed of at least 80% by weight of aggregates derived from reclaimed asphalt pavements relative to the aggregate total weight in the mix.

17. A method for recycling or renovating old pavements, comprising the step of applying directly a rejuvenating binder onto old pavements not having undergone any step of milling or crushing,
wherein the rejuvenating binder comprises by weight of the rejuvenating binder total weight: 85% to 100% by weight of at least one compound based on fatty substances of natural origin, 5% to 15% by weight of bitumen, and 0% to 10% by weight of additives, and
wherein said at least one compound is an esterified and epoxidized tall oil derivative comprising linear hydrocarbon fatty chains of from 8 to 20 carbons.

18. The recycling or renovating method according to claim 17, wherein the rejuvenating binder is used in an anhydrous form or in the form of a rejuvenating binder emulsion.

19. The recycling or renovating method according to claim 18, wherein the rejuvenating binder emulsion comprises in kg/t of the emulsion:
500 to 900 kg/t of rejuvenating binder, and
water to 100% for preparing one ton of emulsion.

20. The recycling or renovating method according to claim 17, wherein the old pavements are combined with the rejuvenating binder at a temperature higher than 100° C.

21. The recycling or renovating method according to claim 17, wherein the reclaimed old pavements are combined with the rejuvenating binder at a temperature ranging from 20 to 100° C.

22. The recycling or renovating method according to claim 17, wherein the bitumen is selected from 10/20 grade or 20/30 grade bitumens.

* * * * *